(12) United States Patent
Nabeshima

(10) Patent No.: US 11,254,814 B2
(45) Date of Patent: Feb. 22, 2022

(54) RESIN COMPOSITION AND MOLDED PRODUCT OBTAINED THEREFROM

(71) Applicant: UNITIKA LTD., Amagasaki (JP)

(72) Inventor: Yutaka Nabeshima, Uji (JP)

(73) Assignee: UNITIKA LTD., Amagasaki (JP)

( * ) Notice: Subject to any disclaimer, the term of this patent is extended or adjusted under 35 U.S.C. 154(b) by 0 days.

(21) Appl. No.: 17/051,943

(22) PCT Filed: Apr. 21, 2020

(86) PCT No.: PCT/JP2020/017239
§ 371 (c)(1),
(2) Date: Oct. 30, 2020

(87) PCT Pub. No.: WO2020/218307
PCT Pub. Date: Oct. 29, 2020

(65) Prior Publication Data
US 2021/0253848 A1      Aug. 19, 2021

(30) Foreign Application Priority Data

Apr. 25, 2019   (JP) .............................. JP2019-084133

(51) Int. Cl.
| | |
|---|---|
| *C08L 67/03* | (2006.01) |
| *B29C 45/00* | (2006.01) |
| *B60Q 1/04* | (2006.01) |
| *C08K 5/527* | (2006.01) |
| *C08L 69/00* | (2006.01) |
| *B29K 67/00* | (2006.01) |
| *B29K 69/00* | (2006.01) |
| *C08K 5/11* | (2006.01) |

(52) U.S. Cl.
CPC .......... *C08L 67/03* (2013.01); *B29C 45/0001* (2013.01); *B60Q 1/04* (2013.01); *C08K 5/527* (2013.01); *C08L 69/00* (2013.01); *B29K 2067/00* (2013.01); *B29K 2069/00* (2013.01); *C08K 5/11* (2013.01)

(58) Field of Classification Search
USPC .................................. 525/437; 528/196, 198
See application file for complete search history.

(56) References Cited

U.S. PATENT DOCUMENTS

| | | | |
|---|---|---|---|
| 4,598,130 | A | 7/1986 | Robeson et al. |
| 5,418,269 | A | 5/1995 | Ishiwa et al. |
| 5,484,874 | A | 1/1996 | Ishiwa et al. |
| 2002/0183428 | A1 | 12/2002 | Hachiya et al. |
| 2003/0125504 | A1 | 7/2003 | Miyoshi et al. |
| 2003/0195329 | A1 | 10/2003 | Funakoshi et al. |

FOREIGN PATENT DOCUMENTS

| | | |
|---|---|---|
| CN | 101565538 A | 10/2009 |
| CN | 102675849 A | 9/2012 |
| CN | 106751660 A | 5/2017 |
| CN | 107586438 A | 1/2018 |
| EP | 3467031 A1 | 4/2019 |
| JP | 5-262969 A | 10/1993 |
| JP | 5-262970 A | 10/1993 |
| JP | 6-200141 A | 7/1994 |
| JP | 11-306823 A | 11/1999 |
| JP | 2000-143951 A | 5/2000 |
| JP | 2000-322918 A | 11/2000 |
| JP | 2001-49104 A | 2/2001 |
| JP | 2001-49105 A | 2/2001 |
| JP | 2002-53748 A | 2/2002 |
| JP | 2002-80711 A | 3/2002 |
| JP | 2003-41131 A | 2/2003 |
| JP | 2004-277438 A | 10/2004 |
| JP | 2009-102581 A | 5/2009 |
| JP | 2010-159332 A | 7/2010 |
| JP | 2013-194171 A | 9/2013 |
| JP | 2014-80577 A | 5/2014 |
| KR | 10-2017-0032672 A | 3/2017 |
| WO | WO 01/92371 A1 | 12/2001 |
| WO | WO-2014021493 A1 * | 2/2014 ........... C07F 9/65746 |
| WO | WO 2017/204078 A1 | 11/2017 |

OTHER PUBLICATIONS

WO2014021493A1 Translation Diphosphite-based antioxidant and polymer resin composition including same (Year: 2014).*
English translation of the International Seach Report for International Application No. PCT/JP2020/017239, dated Jun. 30, 2020.
Partial English translation of the Written Opinion of the International Seaching Authority for International Application No. PCT/JP2020/017239, dated Jun. 30, 2020.
Decision to Grant a Patent for Japanese Application No. 2019-084133, dated Sep. 3, 2019.
International Search Report, issued in PCT/JP2020/017239, PCT/ISA/210, dated Jun. 30, 2020.
Notice of Reasons for Refusal for Japanese Patent Application No. 2019-084133 dated Jun. 18, 2019.

(Continued)

*Primary Examiner* — Terressa Boykin
(74) *Attorney, Agent, or Firm* — Birch, Stewart, Kolasch & Birch, LLP

(57) ABSTRACT

The present invention is to provide a resin composition capable of producing a molded product sufficiently excellent in hydrolysis resistance and mold release characteristics and having an excellent balance between heat resistance and fluidity, even if a heat stabilizer and a mold release agent are contained.

The present invention relates to a resin composition, comprising: (A) a polyarylate resin; (B) a melt-polymerized polycarbonate resin; (C) a specific phosphite compound; and (D) a dipentaerythritol fatty acid ester, a mass ratio (A/B) of the (A) polyarylate resin and the (B) melt-polymerized polycarbonate resin being from 2/98 to 98/2, and the resin composition having a Vicat softening point of 140° C. or higher.

17 Claims, No Drawings

(56) References Cited

OTHER PUBLICATIONS

Chinese First Office Action and Search Report (including an English translation thereof) issued in the corresponding Chinese Patent Application No. 202080002384.4 dated May 6, 2021.
International Preliminary Report on Patentability and Written Opinion of the International Searching Authority for International Application No. PCT/JP2020/017239, dated Nov. 4, 2021.

* cited by examiner

RESIN COMPOSITION AND MOLDED PRODUCT OBTAINED THEREFROM

TECHNICAL FIELD

The present invention relates to a resin composition and a molded product obtained from the resin composition, and more particularly to a resin composition for a molded product, particularly a resin composition for producing a substrate for light reflector, and a molded product obtained from the resin composition.

BACKGROUND ART

Polyarylate resin, which is composed of dihydric phenols such as bisphenol compound, and terephthalic acid and isophthalic acid, is an amorphous polymer and is already well known as an engineering plastic excellent in transparency, mechanical properties, and heat resistance. Such polyarylate resin is used in various fields due to its properties, and it is known that a resin composition obtained by mixing polyarylate with polycarbonate is useful from the viewpoint of improving moldability and impact resistance.

Housings of lamps etc. for vehicle mounting, reflectors, extension reflectors or reflectors (light reflectors) for reflecting light from household electric appliances such as lighting equipments are required to have high brightness, smoothness, and uniform reflectance, and in addition, high heat resistance capable of withstanding heat generation from the light sources, in order to achieve directionality of the lamp light source and reflectivity. For such applications, thermosetting resins have been conventionally used.

In recent years, conversion to a substrate for light reflector formed with a thermoplastic resin, which is capable of responding to higher functionality of light reflectors and diversification of designs and is excellent in productivity, is progressing. The substrate for light reflector formed of a thermoplastic resin composition is required to be excellent in mechanical properties, electrical properties, and other physical and chemical properties, and to have good processability.

Therefore, as a thermoplastic resin composition, a composition mainly containing a polyarylate resin or a mixture of a polyarylate resin and another resin has been used (Patent Literatures 1 and 2). The resin compositions of Patent Literatures 1 and 2 have also been able to secure fluidity by utilizing the characteristics of another resin to be mixed while making full use of the heat resistance of the polyarylate resin. A polycarbonate resin, which is a resin capable of being mixed with such polyarylate resin, has been produced by an interfacial polymerization method using phosgene as a raw material. Such polycarbonate resin can be a resin composition having excellent compatibility with the polyarylate resin and having excellent mechanical properties.

On the other hand, Patent Literatures 3 to 5 disclose techniques using a melt-polymerized polycarbonate resin.

For example, Patent Literature 3 discloses a technique in which a resin composition containing an aromatic polycarbonate resin obtained by a melt polymerization method is used for internal components of office automation equipment and the like from the viewpoints of chemical resistance, hydrothermal fatigability and the like.

Further, for example, Patent Literature 4 discloses a technique in which a resin composition containing an aromatic polycarbonate resin obtained by a melt polymerization method is used for a substrate for a high-density optical disc and the like from the viewpoints of color tone, durability, stability, and the like.

Further, for example, Patent Literature 5 discloses a technique in which a resin composition containing a polycarbonate resin obtained by a melt polymerization method is used for an optical information substrate from the viewpoints of high cycle properties, reduction of mold stains, and the like.

On the other hand, an attempt to add an additive such as a heat stabilizer and a mold release agent to a polymer mixture containing a polyarylate resin and a polycarbonate resin has been made (e.g., Patent Literatures 6 to 13).

CITATIONS LIST

Patent Literatures

Patent Literature 1: JP 2010-159332 A
Patent Literature 2: JP 2014-080577 A
Patent Literature 3: JP 2000-143951 A
Patent Literature 4: WO 01/092371 A
Patent Literature 5: JP 2002-080711 A
Patent Literature 6: JP H06-200141 A
Patent Literature 7: JP 2002-053748 A
Patent Literature 8: JP 2004-277438 A
Patent Literature 9: JP 2003-041131 A
Patent Literature 10: JP 2000-322918 A
Patent Literature 11: WO 2017/204078 A
Patent Literature 12: US 2003/125,504 A
Patent Literature 13: U.S. Pat. No. 4,598,130 B

SUMMARY OF INVENTION

Technical Problems

In recent years, the degree of freedom in automobile design has expanded, and lamp structures for vehicle mounting have become complicated and multifunctional. Along with this, there is an increasing demand for heat resistance of lamp-peripheral members. The inventors of the present invention have found that the following new problems arise when a resin composition containing an interfacially polymerized polycarbonate resin as described in Patent Literatures 1 and 2 together with a polyarylate resin is used for producing (particularly, injection molding) a substrate for a light reflector such as a reflector of lamp for vehecle-mouting (that is, a substrate for light reflector).

(1) A mold has been stained, and clouding has occurred on the molding surface of the mold (clouding resistance of the molding surface). Specifically, the polycarbonate resin, when used alone, can be melted and flowed at a molding temperature (resin temperature during melting) of about 300° C. That is, a molding process can be performed at its temperature. When a molding process is performed in such a region of about 300° C., a mold stain has not occurred even using interfacially polymerized polycarbonate resin alone. Therefore, for imparting heat resistance, when the interfacially polymerized polycarbonate resin is mixed with a polyarylate resin to give a resin composition, the molding temperature is from about 320 to 360° C., depending on the mixing ratio. At such molding temperatures, the use of the resin composition containing the polyarylate resin and the interfacially polymerized polycarbonate resin has caused a mold stain problem. On the other hand, in a resin composition containing polyarylate resin and interfacially polymerized polycarbonate resin, in order to secure fluidity without impairing heat resistance, when a low-viscosity polycarbonate resin is used, in particular, when an interfacially polymerized polycarbonate resin is used, a mold stain has been remarkable.

(2) Clouding has occurred on or around the weld line of the molded product (surface appearance characteristics of the molded product). Specifically, the surface appearance characteristics relating to the clouding of the molded product has become a problem only when injection molding is performed using a mold having a mirror-finished molding surface.

(3) When a vapor deposition layer is formed on a molded product, clouding has occurred on the surface of the vapor deposition layer on or around the weld line of the molded product (degradation of vapor deposition suitability of the molded product). Specifically, the vapor deposition suitability of the molded product relating to clouding of the surface of the vapor deposition layer has become a problem only when the vapor deposition layer is formed on the molded product obtained by injection molding using a mold having a mirror-finished molding surface.

(4) When a molded product with a vapor deposition layer is, as a reflector of lamp for vehicle mounting, exposed to a high-temperature atmosphere due to repeated lighting of the lamp, the heat-aging suitability is good at the beginning, but it has deteriorated relatively early. Specifically, glossiness and/or adhesive properties of the vapor deposition layer has/have decreased relatively early. More specifically, the reflector of lamp for vehicle mounting in the vicinity or upper portion of the light source is particularly exposed to a high temperature, and glossiness and/or adhesive properties of the surface of the vapor deposition layer has/have decreased relatively early. The relatively early decrease of the heat-aging suitability has been a serious problem in recent years as the life of automobiles is extended. In the reflector of lamp for vehicle mounting, it is not allowed that the glossiness of the vapor deposition layer decreased and/or the adhesive properties of the vapor deposition layer deteriorate. Therefore, in a practical molded product as a lamp component, more realistically, not only does degradation of heat resistance due to a mere softening point or the like not occur, but it is also required that glossiness and adhesive properties of a vapor deposition layer do not decrease when a heat-aging test such as annealing is performed.

On the other side, the inventors of the present invention have found that following new problems arise when a heat stabilizer and a mold release agent are added to a polymer mixture containing a polyarylate resin and a melt-polymerized polycarbonate resin, from the viewpoints of heat resistance and mold release characteristics.

(5) Even if a mold release agent is added, mold release characteristics have not sufficiently improved. Specifically, during molding, when the obtained molded product is released from the mold by an ejector pin, a mark of the ejector pin has remained on the molded product because the mold release characteristics of the molded product are not sufficient. When the mark of the ejector pin remains on the molded product, the value of the molded product as an article has decreased.

(6) The problem of hydrolysis resistance, which has not arisen when a polymer mixture containing no additive is used, has arisen when a heat stabilizer and/or a mold release agent is/are added. Specifically, when a heat stabilizer and/or a mold release agent is/are added to the polymer mixture containing a polyarylate resin and a polycarbonate resin, deterioration of hydrolysis resistance of the molded product was experienced. The degradation in the hydrolysis resistance of the molded product causes a decrease in the molecular weight of the polyarylate resin and/or the polycarbonate resin over time when the molded product is used or stored in a high temperature and high humidity environments, and therefore, the value of the molded product as an article has decreased.

An object of the present invention is to provide a resin composition capable of producing a molded product sufficiently excellent in hydrolysis resistance and mold release characteristics, and having an excellent balance between heat resistance and fluidity, even if a heat stabilizer and a mold release agent are contained.

An object of the present invention is also to provide a resin composition capable of producing a molded product sufficiently excellent in hydrolysis resistance, mold release characteristics, surface appearance characteristics, vapor deposition suitability, and heat-aging suitability while sufficiently preventing mold stains, and having an excellent balance between heat resistance and fluidity, even if a heat stabilizer and a mold release agent are contained.

Solutions to Problems

The present inventors have performed a study for the purpose of solving the above-described problems, and consequently, have reached the present invention by discovering that the above-described problems can be solved by using a specific polycarbonate resin, a specific phosphite compound, and a specific fatty acid ester in combination in the resin composition containing polyarylate and polycarbonate.

The gist of the present invention is as follows.

<1> A resin composition, comprising: (A) a polyarylate resin; (B) a melt-polymerized polycarbonate resin; (C) one or more compounds selected from the group consisting of phosphite compounds represented by the following general formulas (I) and (II); and (D) a dipentaerythritol fatty acid ester, a mass ratio (A/B) of the (A) polyarylate resin and the (B) melt-polymerized polycarbonate resin being from 2/98 to 98/2, and the resin composition having a Vicat softening point of 140° C. or higher:

[Chem. 1]

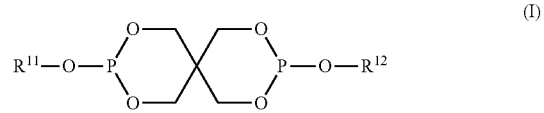

(I)

(In the formula (I), $R^{11}$ and $R^{12}$ each independently represent an aryl group having 6 to 40 carbon atoms or an alkyl group having 1 to 40 carbon atoms);

[Chem. 2]

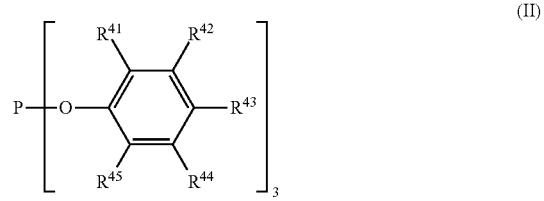

(II)

(In the formula (II), $R^{41}$ to $R^{45}$ are each independently a hydrogen atom or a hydrocarbon group having 1 to 10 carbon atoms).

<2> The resin composition of <1>, in which a content of the (C) phosphite compound is from 0.01 to 0.5 parts by mass with respect to 100 parts by mass of a total amount of the (A) polyarylate resin and the (B) melt-polymerized polycarbonate resin.

<3> The resin composition of <1> or <2>, in which a content of the (D) dipentaerythritol fatty acid ester is from 0.01 to 1.0 parts by mass with respect to 100 parts by mass of the total amount of the (A) polyarylate resin and the (B) melt-polymerized polycarbonate resin.

<4> The resin composition of any one of <1> to <3>, in which the (D) dipentaerythritol fatty acid ester is one or more compounds selected from the group consisting of dipentaerythritol hexalaurate, dipentaerythritol hexamyristate, dipentaerythritol hexapalmitate, dipentaerythritol hexastearate, dipentaerythritol hexabehenate, dipentaerythritol adipic stearate, and dipentaerythritol adipic stearate oligomer.

<5> The resin composition of <1>, in which a mixing ratio of the (A) polyarylate resin and the (B) melt-polymerized polycarbonate resin is from 30/70 to 75/25 by mass ratio, and the (C) phosphite compound is one or more compounds selected from the group consisting of phosphite compounds represented by the following general formula (i-1) and the general formula (II):

[Chem. 3]

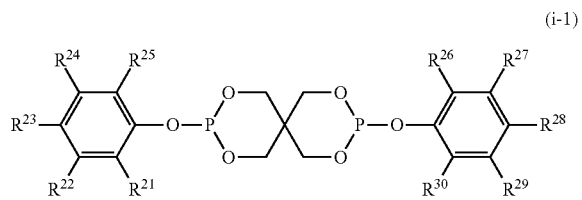

(i-1)

(In the formula (i-1), $R^{21}$ to $R^{30}$ each independently represent a hydrogen atom or a hydrocarbon group having 1 to 20 carbon atoms).

<6> The resin composition of <5>, in which the mixing ratio of the (A) polyarylate resin and the (B) melt-polymerized polycarbonate resin is from 45/55 to 75/25 by mass ratio, the (C) phosphite compound is one or more compounds selected from the group consisting of phosphite compounds represented by the general formula (i-1), and the content of the (C) phosphite compound is from 0.01 to 0.08 parts by mass with respect to 100 parts by mass of the total amount of the (A) polyarylate resin and the (B) melt-polymerized polycarbonate resin.

<7> The resin composition of <6>, in which the mixing ratio of the (A) polyarylate resin and the (B) melt-polymerized polycarbonate resin is from 65/35 to 75/25 by mass ratio.

<8> The resin composition of any one of <1> to <7>, in which a content of a monofunctional phenol compound in the resin composition is 10,000 ppm or less.

<9> The resin composition of any one of <1> to <8>, in which the (B) melt-polymerized polycarbonate resin has a logarithmic viscosity of 0.30 to 0.60 dL/g.

<10> The resin composition of any one of <1> to <9>, in which the (A) polyarylate resin has a logarithmic viscosity of 0.40 to 0.75 dL/g.

<11> The resin composition of any one of <1> to <10>, in which the resin composition has a logarithmic viscosity of 0.35 to 0.65 dL/g.

<12> The resin composition of any one of <1> to <11>, being a resin composition for producing a substrate for light reflector.

<13> The resin composition of any one of <1> to <12>, being a resin composition for producing a substrate for light reflector of a lamp for vehicle mounting.

<14> The resin composition of any one of <1> to <13>, being a resin composition for use in injection molding.

<15> A molded product including the resin composition of any one of <1> to <14>.

<16> A substrate for light reflector using the molded product of <15>.

<17> A lamp for vehicle mounting, using the substrate for light reflector of <16>.

Advantageous Effects of Invention

The resin composition of the present invention is capable of producing a molded product sufficiently excellent in hydrolysis resistance and mold release characteristics, and has an excellent balance between heat resistance and fluidity, even if containing a heat stabilizer and a mold release agent.

The resin composition of the present invention can sufficiently prevent mold stains.

The use of the resin composition of the present invention allows production of a molded product sufficiently excellent in surface appearance characteristics and vapor deposition suitability.

The molded product produced using the resin composition of the present invention has sufficiently excellent heat-aging suitability. For this reason, even if a vapor deposition layer is formed on the molded product and is exposed to a more severe high temperature atmosphere, the deterioration of glossiness and adhesive properties of the vapor deposition layer is sufficiently suppressed.

DESCRIPTION OF EMBODIMENTS

[Resin Composition]

The resin composition of the present invention contains (A) a polyarylate resin and (B) a melt-polymerized polycarbonate resin.

The polyarylate resin is not particularly limited, and any polyarylate can be used. The polyarylate resin contains an aromatic dicarboxylic acid residue and a dihydric phenol residue, and specifically, is an amorphous aromatic polyester polymer composed of an aromatic dicarboxylic acid or its derivative and a dihydric phenol or its derivative. The polyarylate resin can be produced by a solution polymerization method, a melt polymerization method, an interfacial polymerization method, or the like.

Preferable examples of the raw material for introducing the aromatic dicarboxylic acid residue constituting the polyarylate resin include terephthalic acid, isophthalic acid, phthalic acid, chlorophthalic acid, nitrophthalic acid, 2,5-naphthalenedicarboxylic acid, 2,6-naphthalenedicarboxylic acid, 2,7-naphthalenedicarboxylic acid, 1,5-naphthalenedicarboxylic acid, methylterephthalic acid, 4,4'-biphenyldicarboxylic acid, 2,2'-biphenyldicarboxylic acid, 4,4'-diphenyletherdicarboxylic acid, 4,4'-diphenylmethanedicarboxylic acid, 4,4'-diphenylsulfonedicarboxylic acid, 4,4'-diphenylisopropylidene dicarboxylic acid, 1,2-bis(4-carboxyphenoxy)ethane, 5-sodium sulfoisophthalic acid, diphenic acid, and derivatives thereof. Examples of the aromatic dicarboxylic acid derivative include eester compounds of alkyl having 1 to 3 carbon atoms and acid chlorides of the above-described aromatic dicarboxylic acid. These compounds may be used alone or in combination of two or more. Among them, terephthalic acid, isophthalic acid, and derivatives thereof are preferable, and from the viewpoint of the balance between heat resistance and fluidity, it is particularly preferable to use both terephthalic acid or its derivative and isophthalic acid or its derivative as a mixture. In that case, the mixing molar ratio (terephthalic acid/isophthalic acid) is optional in the range of 100/0 to 0/100. In the range of preferably 90/10 to 10/90, more preferably 70/30 to 30/70, particularly preferably 55/45 to 45/55, the obtained polyarylate becomes amorphous and has better heat resistance.

Preferable examples of the raw material for introducing the dihydric phenol residue constituting the polyarylate resin include bisphenols. Specific examples of the bisphenols include, for example, resorcinol, 2,2-bis(4-hydroxyphenyl)propane, 2,2-bis(4-hydroxy-3,5-dimethylphenyl)propane, 2,2-bis(4-hydroxy-3-methylphenyl)propane, 2,2-bis(4-hydroxy-3,5-dibromophenyl)propane, 2,2-bis(4-hydroxy-3,5-dichlorophenyl)propane, 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis(4-hydroxyphenyl)-3,3,5-trimethylcyclohexane, and 1,1-bis(4-hydroxyphenyl)cyclohexane. The polyarylate resin composed of these compounds tends to be amorphous and to have better heat resistance. These compounds may be used alone or in combination of two or more. Among these compounds, 2,2-bis(4-hydroxyphenyl)propane is preferably used, and optimally used alone.

The polyarylate resin has a logarithmic viscosity at the temperature of 25° C., in a solution prepared by dissolving 1.0 g of a sample in 100 ml of 1,1,2,2-tetrachloroethane, of preferably 0.40 to 0.75 dL/g, more preferably 0.45 to 0.65, from the viewpoint of further improving the fluidity of the resin composition of the present invention, and the heat resistance, mold release characteristics, hydrolysis resistance, and mechanical properties of the molded product obtained by molding the resin composition.

The polyarylate resin can be produced by a known method or is commercially available. Examples of the commercially available polyarylate resin include U-POWDER D type (logarithmic viscosity: 0.72) and L type (logarithmic viscosity: 0.54) (both made by Unitika Ltd.).

The melt-polymerized polycarbonate resin includes a polycarbonate resin obtained by a melt-polymerization reaction, that is, a transesterification reaction of an aromatic dihydroxy compound and a carbonic acid diester. A conventional polycarbonate resin obtained by an interfacial polymerization method (phosgene method) in which an aromatic dihydroxy compound and phosgene are allowed to react in the presence of an aqueous sodium hydroxide solution and a methylene chloride solvent is excluded from the melt-polymerized polycarbonate resin. In the present invention, by using a melt-polymerized polycarbonate, not an interfacially polymerized polycarbonate, as the polycarbonate, the balance between heat resistance and fluidity of the resin composition is increased, and not only mold stains are prevented but also mold release characteristics, surface appearance characteristics, vapor deposition suitability, and heat-aging suitability of the molded product are improved.

The aromatic dihydroxy compound constituting the melt-polymerized polycarbonate resin is a compound represented by the general formula: HO—Ar—OH. In the formula, Ar is a divalent aromatic residue, for example, a phenylene group, a naphthylene group, a biphenylene group, a pyridylene group, or a divalent aromatic group represented by —$Ar^1$—$Y$—$Ar^2$—. $Ar^1$ and $Ar^2$ each independently represent a divalent carbocyclic or heterocyclic aromatic group having 5 to 70 carbon atoms, and Y represents a divalent alkane group having 1 to 30 carbon atoms, particularly 1 to 5 carbon atoms (that is, an alkylene group). Preferable Ar is a phenylene group. Preferable $Ar^1$ and $Ar^2$ are phenylene groups. Preferable Y is an isopropylidene group.

Specific examples of the aromatic dihydroxy compound include, for example, bis(4-hydroxyaryl)alkanes such as bis(4-hydroxyphenyl)methane, 2,2-bis(4-hydroxyphenyl)propane, 2,2-bis(4-hydroxy-3-methylphenyl)propane, 1,1-bis(4-hydroxyphenyl)-1-phenylethane, 1,1-bis(4-hydroxyphenyl)-3,3,5-trimethylcyclohexane, 4,4'-[1,3-phenylenebis(1-methylethylidene)]bisphenol, 4,4'-[1,4-phenylenebis(1-methylethylidene)]bisphenol, 9,9-bis(4-hydroxyphenyl)fluorene, and 9,9-bis(4-hydroxy-3-methylphenyl)fluorene. Among these compounds, 2,2-bis(4-hydroxyphenyl)propane [bisphenol A] is particularly preferable.

The aromatic dihydroxy compound used in the present invention may be a single type or two or more types. A typical example of the aromatic dihydroxy compound is a bisphenol A, and it is preferable to use a bisphenol A at a ratio of 85% by mol or more as the aromatic dihydroxy compound.

Phosgene may be used instead of or together with the carbonic acid diester constituting the melt-polymerized polycarbonate resin.

A typical example of the carbonic acid diester may be substituted or unsubstituted diaryl carbonates represented by the general formula: $R^1$—$Ar^3$—O—CO—O—$Ar^4$—$R^2$. $Ar^3$ and $Ar^4$ are each independently a divalent aromatic residue, and examples thereof include a phenylene group and a naphthylene group. $R^1$ and $R^2$ are each independently a hydrogen atom or an alkyl group having 1 to 10 carbon atoms. Preferable $Ar^3$ and $Ar^4$ are phenylene groups. Preferable $R^1$ and $R^2$ are each independently a hydrogen atom or an alkyl group having 1 to 5 carbon atoms. More Preferable $R^1$ and $R^2$ are the same group as each other.

Among these diaryl carbonates, a symmetrical diaryl carbonate such as unsubstituted diphenyl carbonate or a lower alkyl group-substituted diphenyl carbonate such as ditolyl carbonate or di-t-butylphenyl carbonate is preferable. Diphenyl carbonate, which is a diaryl carbonate having the simplest structure, is particularly preferable. The symmetrical diaryl carbonate is a diaryl carbonate which can be represented by a chemical structural formula having line symmetry when represented by a chemical structural formula in which hydrogen atoms and carbon atoms are abbreviated.

The carbonic acid diester may be used alone or in combination of two or more.

The melt-polymerized polycarbonate resin can be obtained by a transesterification method based on a melt-polymerization reaction. The transesterification method is a method in which an aromatic dihydroxy compound and a carbonic acid diester are subjected to transesterification reaction in a molten state with heating in the presence or absence of a catalyst and under reduced pressure and/or an inert gas flow, to thereby perform polycondensation. There is no limitation on the polymerization method, the apparatus, and the like. For example, in the case of the melt transesterification method, a melt-polymerized polycarbonate resin can be easily produced by using a stirring tank type reactor, a thin film reactor, a centrifugal thin film evaporation reactor, a surface renewal type twin-screw kneading reactor, a twin-screw horizontal stirring reactor, a wet wall type reactor, a perforated plate type reactor which carries out polymerization while freely dropping, a wire-equipped perforated plate type reactor which carries out polymerization while dropping along the wire or the like, alone or in combination.

The reaction temperature on transesterification is usually in the range of 50 to 350° C., and is preferably selected from the temperature range of 100 to 300° C. The reaction pressure varies depending on the molecular weight of the polycarbonate in the polymerization process, but in the case of a number average molecular weight of 5000 or less, the reaction pressure is generally in the range of 400 Pa to normal pressure, and in the case of a number average molecular weight of 5000 or more, the reaction pressure is in the range of 10 to 400 Pa. Among the above-described reactors, in particular, a method of using a perforated plate type reactor which carries out polymerization while freely dropping and/or a wire-equipped perforated plate type reactor which carries out polymerization while dropping along the wire is/are preferable, and in such a case, the polymerization is preferably performed at a temperature not exceeding 270° C.

A usage ratio (charge ratio) of the aromatic dihydroxy compound and the carbonic acid diester varies depending on the kinds of the aromatic dihydroxy compounds and carbonic acid diesters used, the target molecular weight, the hydroxyl group terminal ratio, the polymerization conditions, and the like. The carbonic acid diester is usually used at a ratio of 0.9 to 2.5 mol, preferably 0.95 to 1.5 mol, more preferably 1.00 to 1.2 mol per 1 mol of the aromatic dihydroxy compound.

A branching agent may be used together in the production of the melt-polymerized polycarbonate resin in order to obtain a polycarbonate having a desired molecular weight. Tri- or higher functional compounds as the branching agent that can be used in the present invention include compounds having a phenolic hydroxyl group or a carboxyl group, and examples thereof include trimellitic acid, 1,3,5-benzenetricarboxylic acid, pyromellitic acid, 1,1,1-tris(4-hydroxyphenyl)ethane, phloroglysin, 2,4,4'-trihydroxybenzophenone, 2,2',4,4'-tetrahydroxybenzophenone, 2,4,4'-trihydroxydiphenyl ether, 2,2',4,4'-tetrahydroxydiphenyl ether, 2,4,4'-trihydroxydiphenyl-2-propane, 2,4,4'-trihydroxydiphenylmethane, 2,2'4,4'-tetrahydroxydiphenylmethane, 1-[α-methyl-α-(4'-hydroxyphenyl)ethyl]-4-[α',α"-bis(4"-hydroxyphenyl)ethyl]benzene, α,α',α"-tris(4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-peptene-2,4,6-dimethyl-2,4,6-tris(4'-hydroxyphenyl)-peptane, 1,3,5-tris(4'-hydroxyphenyl)benzene, 2,2-bis[4,4-bis(4'-hydroxyphenyl)cyclohexyl]-propane, 2,6-bis(2'-hydroxy-5'-isopropylbenzyl)-4-isopropylphenol, bis[2-hydroxy-3-(2'-hydroxy-5'-melbenzyl)-5-methylphenyl]methane, bis[2-hydroxy-5'-isopropbenzyl]-5-methylphenyl]methane, tetrakis(4-hydroxyphenyl)methane, tris(4-hydroxyphenyl)phenylmethane, 2',4',7-trihydroxyflavone, 2,4,4-trimethyl-2',4',7-trihydroxyflavone, 1,3-bis(2',4'-dihydroxyphenylisopropyl)benzene, tris(4'-hydroxyaryl)-amyl-S-triazine, and 1-[α-methyl-α-(4'-hydroxyphenyl)ethyl]-3-[α',α'-bis(4"-hydroxyphenyl)ethyl]benzene.

The melt-polymerized polycarbonate resin has a logarithmic viscosity of preferably 0.30 to 0.60 dL/g, more preferably 0.30 to 0.50 dL/g, from the viewpoint of further improving the fluidity of the resin composition of the present invention, and the heat resistance, mold release characteristics, hydrolysis resistance, and mechanical properties of the molded product obtained by molding the resin composition.

The logarithmic viscosity of the melt-polymerized polycarbonate resin used is a value measured in the same manner as the logarithmic viscosity of the polyarylate resin except that the melt-polymerized polycarbonate resin is used.

The logarithmic viscosity of the melt-polymerized polycarbonate resin is usually lower than that of the polyarylate resin. A difference obtained by subtracting the logarithmic viscosity of the melt-polymerized polycarbonate resin from the logarithmic viscosity of the polyarylate resin is preferably 0.05 to 0.25 dL/g, more preferably 0.10 to 0.20 dL/g, from the viewpoint of the balance between the fluidity of the resin composition and the heat resistance of the molded product obtained from the resin composition.

The melt-polymerized polycarbonate resin is also commercially available. Examples of the commercially available melt-polymerized polycarbonate resin include WONDERLITE PC-108U, PC-110, PC-115, PC-122, PC-175 (made by Chimei Corporation), Infino SC-1060U, SC-1100R, SC-1100UR, SC-1220R, SC-1220UR, SC-1280UR (made by LOTTE Advanced Materials Co. Ltd.), HOPELEX PC-1600 (made by LOTTE Chemical Corporation), and LEXAN 172L (made by SABIC).

In the resin composition of the present invention, the mixing ratio of the polyarylate resin (A) and the melt-polymerized polycarbonate resin (B) needs to be a (A)/(B) of 2/98 to 98/2 (mass ratio), and is preferably from 30/70 to 75/25 (mass ratio), more preferably from 45/55 to 75/25 (mass ratio), still more preferably from 65/35 to 75/25 (mass ratio), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. In particular, when the heat resistance is considered important, the polyarylate resin is used in an amount of 50% by mass or more, preferably 60% by mass or more, more preferably 70% by mass or more, in the resin composition. When the contents of the polyarylate resin and the melt-polymerized polycarbonate resin are represented by "% by mass", each of these contents is the ratio with respect to the total amount of the polyarylate resin and the melt-polymerized polycarbonate resin. When the mixing ratio of the polyarylate resin (A) and the melt-polymerized polycarbonate (B) is out of the above range, the balance between the heat resistance and the fluidity is lost, and the heat resistance or the fluidity deteriorates.

The resin composition of the present invention further contains a specific phosphite compound (C) and a specific fatty acid ester (D). By containing the specific phosphite compound (C) and the specific fatty acid ester (D) in combination in the systems of the polyarylate resin (A) and the melt-polymerized polycarbonate resin (B), the resin composition of the present invention can produce a molded product sufficiently excellent in hydrolysis resistance and mold release characteristics, and can provide a resin composition having an excellent balance between heat resistance and fluidity. Moreover, the resin composition of the present invention can produce a molded product sufficiently excellent in surface appearance characteristics, vapor deposition suitability, and heat-aging suitability while sufficiently preventing mold stains. When either one of the specific phosphite compound (C) and the specific fatty acid ester (D) alone is used, when the specific phosphite compound (C) is used in combination with another mold release agent, and when another heat stabilizer and the specific fatty acid ester (D) are used in combination, the mold release characteristics of the obtained molded product deteriorates. Moreover, in these cases, the hydrolysis resistance, the clouding resistance relating to mold stains, and the surface appearance characteristics, vapor deposition suitability, and heat-aging suitability of the molded product may deteriorate.

The specific phosphite compound (C) is one or more compounds selected from the group consisting of phosphite compounds represented by the following general formulas (I) and (II). Hereinafter, the phosphite compound represented by the general formula (I) and the phosphite compound represented by the general formula (II) will be described in detail in this order.

[Chem. 4]

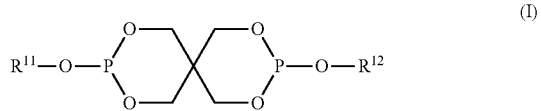

(I)

In the formula (I), $R^{11}$ and $R^{12}$ each independently represent an aryl group having 6 to 40 carbon atoms or an alkyl group having 1 to 40 carbon atoms. $R^{11}$ and $R^{12}$ preferably represent the same group as each other.

In the formula (I), the number of carbon atoms of the aryl group as $R^H$ and/or $R^{12}$ is preferably from 6 to 22, more preferably from 6 to 14, still more preferably from 6 or 10, from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. The number of carbon atoms of the aryl group does not include the number of carbon atoms of the below-described substituent that the aryl group may have. Specific examples of the aryl group include, for example, a phenyl group, a naphthyl group, and an anthryl group. These aryl groups may have a monovalent hydrocarbon group as a substituent. The monovalent hydrocarbon group as a substituent that the aryl group may have may be a monovalent saturated hydrocarbon group (e.g., an alkyl group), or a monovalent unsaturated hydrocarbon group (e.g., an arylalkyl group), and is preferably a monovalent saturated hydrocarbon group (e.g. an alkyl group) from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. When the aryl group has a plurality of substituents, the plurality of substituents may be independently selected. The number of carbon atoms of the monovalent hydrocarbon group as a substituent that the aryl group may have is not particularly limited, and is preferably from 1 to 20, more preferably from 1 to 12 from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. For example, the number of carbon atoms of a monovalent saturated hydrocarbon group (e.g., an alkyl group) as a substituent that the aryl group may have is preferably from 1 to 10, more preferably 1 to 5, still more preferably from 1 to 4 from the same viewpoint as above. Further, for example, the number of carbon atoms of the monovalent unsaturated hydrocarbon group (e.g., an arylalkyl group) as a substituent that the aryl group may have, is preferably from 7 to 20, more preferably from 7 to 12, still more preferably from 7 to 10 from the same viewpoint as above. Specific examples of the alkyl group as a substituent that the aryl group may have include, for example, a methyl group, an ethyl group, a n-propyl group, an isopropyl group, a n-butyl group, an isobutyl group, a sec-butyl group, a tert-butyl group, a pentyl group, a hexyl group, a heptyl group, an octyl group, a nonyl group, and a decyl group. Specific examples of the arylalkyl group as a substituent that the aryl group may have include, for example, a benzyl group, a 2-phenylethyl group, and a cumyl group.

In the formula (I), the number of carbon atoms of the alkyl group as $R^{11}$ and/or $R^{12}$ is preferably from 10 to 30, more preferably from 10 to 26, still more preferably from 14 to 22, from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. The alkyl group may be linear or branched, preferably linear. Specific examples of the alkyl group as $R^{11}$ and/or $R^{12}$ include, for example, a decyl group, an undecyl group, a lauryl group, a tridecyl group, a myristyl group, a pentadecyl group, a cetyl group, a heptadecyl group, a stearyl group, a nonadecyl group, and an eicosyl group.

Examples of the phosphite compound represented by the formula (I) include phosphite compounds represented by the following general formulas (i-1) to (i-2).

[Chem. 5]

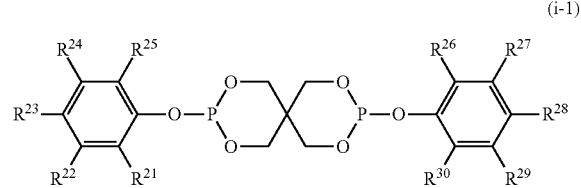

(i-1)

In the formula (i-1), $R^{21}$ to $R^{30}$ each independently represent a hydrogen atom or a group similar to the monovalent hydrocarbon group as a substituent of the aryl group in the formula (I) (e.g., a monovalent saturated hydrocarbon group having 1 to 10 carbon atoms (particularly, an alkyl group) and/or a monovalent unsaturated hydrocarbon group having 7 to 20 carbon atoms (e.g., an arylalkyl group)). $R^{21}$ to $R^{30}$ are preferably each independently a hydrogen atom or an alkyl group having 1 to 5 carbon atoms, particularly 1 to 3 carbon atoms, from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold.

In the formula (i-1), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold, preferable $R^{21}$ to $R^{30}$ are as follows:

Of $R^{21}$ to $R^{30}$, $R^{21}$, $R^{23}$, $R^{28}$, and $R^{30}$ each independently represent an alkyl group having 1 to 5 carbon atoms, particularly 1 to 4 carbon atoms, or an arylalkyl group having 7 to 12 carbon atoms, particularly 7 to 10 carbon atoms, $R^{25}$ and $R^{26}$ are each independently a hydrogen atom, an alkyl group having 1 to 5 carbon atoms, particularly 1 to 4 carbon atoms, or an arylalkyl group having 7 to 12 carbon atoms, and particularly 7 to 10 carbon atoms, and the remaining groups are hydrogen atoms;

of $R^{21}$ to $R^{30}$, $R^{21}$, $R^{23}$, $R^{25}$, $R^{26}$, $R^{28}$ and $R^{30}$ are each independently an alkyl group having 1 to 5 carbon atoms, particularly 1 to 4 carbon atoms, or an arylalkyl group having 7 to 12 carbon atoms, particularly 7 to 10 carbon atoms, and the remaining groups are hydrogen atoms; or of $R^{21}$ to $R^{30}$, $R^{22}$, $R^{24}$, $R^{27}$, and $R^{29}$ are each independently an alkyl group having 1 to 5 carbon atoms, particularly 1 to 4 carbon atoms, and the remaining groups are hydrogen atoms.

Among the phosphite compounds represented by the general formula (i-1), from the viewpoint of further improving the clouding resistance of the molding surface of the mold, a phosphite compound having a melting point of 200° C. or higher is preferable, a phosphite compound having a melting point of 210° C. or higher is more preferable, and a phosphite compound having a melting point of 220° C. or higher is still more preferable. The upper limit of the melting point of the phosphite compound is not particularly limited, and the melting point of the phosphite compound is usually 280° C. or lower, particularly 250° C. or lower.

Specific examples of the phosphite compound represented by the formula (i-1) include, for example, the following compounds:
Bis(2,4-di-tert-butylphenyl)pentaerythritol diphosphite;
bis(2,6-di-tert-butyl-4-methylphenyl)pentaerythritol diphosphite;
bis(2,4-dimethyl-6-tert-butylphenyl)pentaerythritol diphosphite;
bis(2,4,6-tri-tert-butylphenyl)pentaerythritol diphosphite;
bis(2-methyl-4,6-di-tert-butylphenyl)pentaerythritol diphosphite;
bis(3,5-di-tert-butylphenyl)pentaerythritol diphosphite;
bis(nonylphenyl)pentaerythritol diphosphite; and
bis(2,4-dicumylphenyl)pentaerythritol diphosphite.

The phosphite compound represented by the formula (i-1) is commercially available. Specific examples of the trade name thereof include, for example, "ADK STAB PEP-24G" (bis(2,4-di-tert-butylphenyl) pentaerythritol diphosphite) (melting point: 165° C.), "ADK STAB PEP-36" (bis(2,6-di-tert-butyl-4-methylphenyl)pentaerythritol diphosphite) (melting point: 237° C.), and "ADK STAB PEP-4C" (bis(nonylphenyl)pentaerythritol diphosphite) made by ADEKA Corporation, and "Doverphos S-9228" (bis(2,4-dicumylphenyl)pentaerythritol diphosphite) (melting point: 225° C.) made by Dover Chemical Corporation.

[Chem. 6]

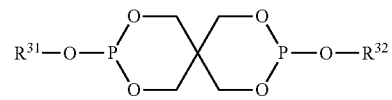

(i-2)

In the formula (i-2), $R^{31}$ and $R^{32}$ each independently represent a group similar to the alkyl group as $R^{11}$ and/or $R^{12}$ in the formula (I) (e.g., an alkyl group having 10 to 30 carbon atoms). $R^{31}$ and $R^{32}$ are preferably the same group as each other from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold.

In the formula (i-2), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold, preferable $R^{31}$ and $R^{32}$ are as follows:

$R^{31}$ and $R^{32}$ are each independently a linear alkyl group having 10 to 26 carbon atoms, and particularly 14 to 22 carbon atoms.

Specific examples of the phosphite compound represented by the formula (i-2) include, for example, the following compounds:
Distearyl pentaerythritol diphosphite.

The phosphite compound represented by the formula (i-2) is commercially available. Specific examples of the trade name thereof include, for example, "ADK STAB PEP-8" (distearyl pentaerythritol diphosphite) made by ADEKA Corporation.

[Chem. 7]

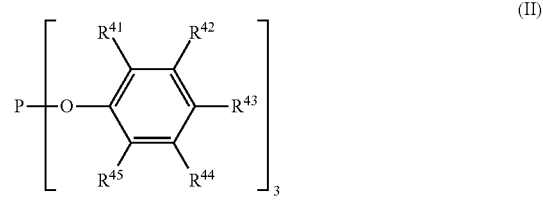

(II)

In the formula (II), $R^{41}$ to $R^{45}$ are each independently a hydrogen atom or a hydrocarbon group having 1 to 10 carbon atoms.

In the formula (II), the number of carbon atoms of the hydrocarbon group as $R^{41}$ to $R^{45}$ is preferably from 1 to 5, more preferably from 1 to 4, from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. The hydrocarbon group is a monovalent hydrocarbon group, and may be a monovalent saturated hydrocarbon group or a monovalent unsaturated hydrocarbon group, preferably a monovalent saturated hydrocarbon group (e.g., an alkyl group) from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. Specific examples of the hydrocarbon group as $R^{41}$ to $R^{45}$ include, for example, alkyl groups such as a methyl group, an ethyl group, a n-propyl group, an isopropyl group, a n-butyl group, an isobutyl group, a sec-butyl group, a tert-butyl group, a pentyl group, a hexyl group, a heptyl group, an octyl group, a nonyl group, and a decyl group. The alkyl group may be linear or branched, preferably linear.

In the formula (II), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold, preferable $R^{41}$ to $R^{45}$ are as follows:

Of $R^{41}$ to $R^{45}$, $R^{41}$ and $R^{43}$ are each independently an alkyl group having 1 to 5 carbon atoms, particularly 1 to 4 carbon atoms, $R^{45}$ is a hydrogen atom or an alkyl group having 1 to 5 carbon atoms, particularly 1 to 4 carbon atoms, and the remaining groups are hydrogen atoms.

Specific examples of the phosphite compound represented by the formula (II) include, for example, the following compounds:
tris(2,4-di-tert-butylphenyl)phosphite;
tris(2,4,6-tri-tert-butylphenyl)phosphite;
tris(4-methyl-2,6-di-tert-butylphenyl)phosphite;
triphenylphosphite; and
trinonylphenyl phosphite.

The phosphite compound represented by the formula (II) is commercially available. Specific examples of the trade name thereof include, for example, "ADK STAB 1178" made by ADEKA Corporation, "SUMILIZER TNP" made by Sumitomo Chemical Co., Ltd., "JP-351" made by Johoku Chemical Co., Ltd., "ADK STAB 2112" made by ADEKA Corporation, "Irgafos 168" made by BASF, and "JP-650" made by Johoku Chemical Co., Ltd.

From the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold, among the phosphite compounds (C), preferable are one or more compounds selected from the group consisting of phosphite compounds represented by the above general formulas (i-1), (i-2) and (II), more preferable are one or more compounds selected from the group consisting of phosphite compounds represented by the above general formulas (i-1) and (II), and most preferable are one or more compounds selected from the group consisting of phosphite compounds represented by the above general formula (i-1).

A content of the phosphite compound (C) is not particularly limited, and is preferably from 0.01 to 0.5 parts by mass, more preferably from 0.01 to 0.4 parts by mass, still more preferably from 0.01 to 0.08 parts by mass, most preferably from 0.02 to 0.06 parts by mass, with respect to 100 parts by mass of the total amount of the polyarylate resin (A) and the melt-polymerized polycarbonate resin (B), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. When two or more phosphite compounds (C) are contained, the total amount thereof may be within the above range.

The specific fatty acid ester (D) is dipentaerythritol fatty acid ester. The dipentaerythritol fatty acid ester may be a partially esterified compound obtained by esterifying a part of the hydroxyl groups of dipentaerythritol with a fatty acid, an all-esterified compound obtained by esterifying all of the hydroxyl groups of dipentaerythritol with a fatty acid, or a mixture thereof. The dipentaerythritol fatty acid ester is preferably an all-esterified compound from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. Even if another fatty acid ester such as a pentaerythritol fatty acid ester is used instead of the fatty acid ester (D), the mold release characteristics and heat-aging suitability of the molded product deteriorate.

The fatty acid constituting the dipentaerythritol fatty acid ester may be a saturated fatty acid, an unsaturated fatty acid, or a mixture thereof, and is preferably a saturated fatty acid from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. The number of carbon atoms of the fatty acid is not particularly limited, and is preferably from 1 to 30, more preferably from 2 to 26, still more preferably from 10 to 20, from the same viewpoint as above. Examples of the saturated fatty acid capable of constituting the dipentaerythritol fatty acid ester include acetic acid, propionic acid, pentanoic acid, pivalic acid, caproic acid, caprylic acid, octanoic acid, nonanoic acid, dodecanoic acid, lauric acid, tridecanoic acid, myristic acid, palmitic acid, stearic acid, arachidic acid, behenic acid, and lignoceric acid. Examples of the unsaturated fatty acid capable of constituting the dipentaerythritol fatty acid ester include acrylic acid, crotonic acid, isocrotonic acid, undecylenic acid, oleic acid, elaidic acid, cetoleic acid, linoleic acid, linolenic acid, and arachidonic acid. When two or more molecules of fatty acid are contained as fatty acids constituting one molecule of dipentaerythritol fatty acid ester, the two or more molecules of fatty acid may contain only one type of fatty acid, or two or more types of fatty acids different from each other. From the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold, preferable dipentaerythritol fatty acid ester contains 6 molecules of fatty acid per molecule, and the 6 molecules of fatty acid contain only one type of fatty acid.

The fatty acids constituting the dipentaerythritol fatty acid ester may partially contain an aliphatic dicarboxylic acid. When the fatty acid contains an aliphatic dicarboxylic acid, the aliphatic dicarboxylic acid forms an ester bond with the hydroxyl group of dipentaerythritol with one carboxyl group, and the other carboxyl group is free. Examples of the aliphatic dicarboxylic acid include saturated aliphatic dicarboxylic acids such as oxalic acid, malonic acid, succinic acid, glutaric acid, adipic acid, pimelic acid, suberic acid, azelaic acid, and sebacic acid; and unsaturated aliphatic dicarboxylic acids such as maleic acid and fumaric acid. Examples of the ester compound include dipentaerythritol adipic stearate using adipic acid as the aliphatic dicarboxylic acid.

As the dipentaerythritol fatty acid ester, an ester compound in which a polyol oligomerized by a condensation reaction of dipentaerythritol and a dicarboxylic acid is esterified with an aliphatic, alicyclic or aromatic carboxylic acid can also be used. For example, when adipic acid is used as the aliphatic dicarboxylic acid, that is, an ester compound in which pentaerythritol is oligomerized with adipic acid and then esterified with stearic acid, and the like can also be used. Examples of these ester compound include dipentaerythritol adipic stearate oligomer.

Specific examples of the fatty acid ester (D) include, for example, dipentaerythritol hexalaurate, dipentaerythritol hexamyristate, dipentaerythritol hexapalmitate, dipentaerythritol hexastearate, dipentaerythritol hexabehenate, dipentaerythritol adipic stearate, and dipentaerythritol adipic stearate oligomer. Among these dipentaerythritol fatty acid esters, preferable is/are one or more fatty acid esters selected from the group consisting of dipentaerythritol hexalaurate, dipentaerythritol hexamyristate, dipentaerythritol hexapalmitate, dipentaerythritol hexastearate, and dipentaerythritol hexabehenate, and more preferable is dipentaerythritol hexastearate, from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold.

The fatty acid ester (D) is commercially available. Specific examples of the commercially available product include dipentaerythritol hexastearate (VPG-2571 made by Emery Oleochemicals).

The content of the fatty acid ester (D) is not particularly limited, and is preferably from 0.01 to 1.0 parts by mass, more preferably from 0.01 to 0.8 parts by mass, still more preferably from 0.01 to 0.6 parts by mass, and most preferably from 0.01 to 0.4 parts by mass, with respect to 100 parts by mass of the total amount of the polyarylate resin (A) and the melt-polymerized polycarbonate resin (B), from the viewpoint of further improving the fluidity of the resin composition, the heat resistance, mold release characteristics, hydrolysis resistance, surface appearance characteristics, vapor deposition suitability, and heat-aging suitability of the molded product obtained by molding the resin composition, and the clouding resistance of the molding surface of the mold. When two or more fatty acid esters (D) are contained, the total amount thereof may be within the above range.

The resin composition of the present invention may further contain an additive such as a fatty acid ester other than the dipentaerythritol fatty acid ester, a colorant, and a glittering material such as aluminum powder or pearl pigment.

Examples of the fatty acid ester other than the dipentaerythritol fatty acid ester include monoglyceride stearate, diglyceride stearate, triglyceride stearate, monosorbitate stearate, monoglyceride behenate, propylene glycol monostearate, biphenyl biphenate, sorbitan monostearate, 2-ethylhexyl stearate, pentaerythritol monostearate, pentaerythritol tetrastearate, and pentaerythritol tetrapelargonate. These fatty acid esters can be used in combination with the dipentaerythritol fatty acid ester within a range that does not impair the above properties.

A content of the fatty acid ester other than the dipentaerythritol fatty acid ester is not particularly limited, and is preferably 2 parts by mass or less (particularly, from 0.01 to 2 parts by mass), more preferably 1 part by mass or less (particularly from 0.02 to 1 part by mass), with respect to 100 parts by mass of the total amount of the polyarylate resin (A) and the melt-polymerized polycarbonate resin (B). When two or more fatty acid esters other than the dipentaerythritol fatty acid ester are contained, the total amount thereof may be within the above range.

By containing a colorant in the resin composition of the present invention, molded products having various color tones can be obtained. Examples of the colorant include pigments and dyes of various types and colors. The colorant is preferably a pigment from the viewpoint of further improving the clouding resistance of the molding surface of the mold and the surface appearance characteristics, vapor deposition suitability, and heat-aging suitability of the molded product.

The colorant can be selected according to applications of the molded product. For example, when used as a base for a light reflector such as a lamp reflector or an extension reflector of an automobile component, the molded product preferably has a black color or a gray color.

When the molded product has a black color, the resin composition of the present invention preferably contains a black pigment.

When the molded product has a gray color, the resin composition of the present invention preferably contains a black pigment and a white pigment in combination.

The black pigment is an inorganic pigment having a black color, and examples thereof include carbon black, acetylene black, lamp black, bone black, graphite, iron black, aniline black, cyanine black, and titanium black. The black pigment may be used alone or in combination of two or more.

The white pigment is an inorganic pigment having a white color, and examples thereof include titanium oxide, zinc oxide, zinc sulfide, zinc sulfate, barium sulfate, calcium carbonate, and alumina oxide. The white pigment can be used alone or in combination of two or more.

When the molded product (particularly, a substrate for light reflector) is colored black or gray, a black dye may be used instead of the black pigment or in combination with the black pigment. Examples of the black dye include dyes such as quinoline compounds, anthraquinone compounds, and perinone compounds. All of these have high heat resistance and can be used alone or in combination of two or more. Examples of commercially available black dyes include Solvent Black 3, 5, 7, 22, 27, 29 or 34, Modant Black 1, 11 or 17, Acid Black 2 or 52, or Direct Black 19 or 154 (the numerical values are color index (C.I.) numbers). In addition to the above, examples thereof include as black azine-based condensation mixture, "NUBIAN" (registered trademark) BLACK PC-8550 and PC-0850, and as black neutral dye mixture, BLACK PC-5856, PC-5857, and PC-5877 (hereinabove all made by Orient Chemical Industries Co., Ltd.).

The pigment (particularly, the black pigment) and the dye (particularly, the black dye) may be used in combination, but preferably each used alone in order to enhance each effect. Although any of the molded products colored with a pigment or a dye can be vapor-deposited with aluminum, the molded product containing a pigment (particularly a black pigment) is suitable as a substrate for light reflector for vapor deposition of aluminum. On the other hand, it is preferable to use a molded product containing a dye (particularly a black dye) without vapor deposition of aluminum.

A content of the colorant is preferably from 0.01 to 2 parts by mass, more preferably from 0.02 to 1 part by mass, still more preferably from 0.03 to 0.5 parts by mass, with respect to 100 parts by mass of the total amount of the polyarylate resin (A) and the melt-polymerized polycarbonate resin (B). When two or more colorants are contained, the total amount thereof may be within the above range. By using a colorant (particularly a black pigment and a black dye) in the amount in the above range, the molded product absorbs visible light and black appears (piano black). In particular, when the black neutral dye mixture as described above is used, the molded product allows infrared rays to pass through, so that problems such as heat deformation of the molded product or an article incorporating the molded product can be suppressed.

The resin composition of the present invention can be obtained by melt-kneading the polyarylate resin (A), the melt-polymerized polycarbonate resin (B), the phosphite compound (C) and the fatty acid ester (D), and a desired additive, and usually has a pellet form.

The Vicat softening point of the resin composition of the present invention is usually 140° C. or higher, preferably 145° C. or higher, more preferably 150° C. or higher, and from the viewpoint of further improving heat resistance, it is preferably 155° C. or higher, more preferably 160° C. or higher, still more preferably 170° C. or higher, most preferably 175° C. or higher. When the resin composition of the present invention is used, for example, in applications such as a light-reflecting substrate (particularly, a reflector), it is particularly important that the Vicat softening point is 140° C. or higher as a practical index of heat resistance. As a vehicle-mounted lamp component, the reflector must have durability against heat when the lamp is lit for a long period of time, and the molded product is not allowed to distort and/or deteriorate due to heat. For example, it is not preferable that the molded product is distorted because the optical axis is likely to be displaced and the function of the vehicle-mounted lamp cannot be sufficiently achieved.

The resin composition of the present invention has a logarithmic viscosity of preferably 0.35 to 0.65 dL/g, more preferably 0.40 to 0.55 dL/g, from the viewpoint of further improving the fluidity of the resin composition, and the heat resistance and mechanical properties of the molded product obtained by molding the resin composition. As the logarithmic viscosity of the resin composition, used is a value measured in the same manner as the logarithmic viscosity of the polyarylate resin except that the resin composition is used.

In the resin composition of the present invention, a content of the monofunctional phenol compound is preferably 10000 ppm or less (usually from 100 to 10000 ppm), particularly preferably from 500 to 7000 ppm, more preferably from 1000 to 7000 ppm, still more preferably from 1500 to 7000 ppm, particularly preferably from 2500 to 6500 ppm, most preferably from 4000 to 6500 ppm, from the viewpoint of further improving the fluidity of the resin composition, the heat resistance of the molded product obtained by molding the resin composition, the clouding resistance of the molding surface of the mold, and the surface appearance characteristics, vapor deposition suitability, and heat-aging suitability of the molded product.

Specific examples of the monofunctional phenol compound include phenol, isopropylphenol, p-tert-butylphenol, p-cresol, p-cumylphenol, 2-phenylphenol, 4-phenylphenol, and isooctylphenol.

As the content of the monofunctional phenol compound, a value measured by pyrolysis/gas chromatography-mass spectrometry is used. In the present invention, as the content of the monofunctional phenol compound, the total content of particularly phenol, p-tert-butylphenol, and p-cumylphenol is used.

As a method for controlling the content of the monofunctional phenol compound, it is necessary to use a melt-polymerized polycarbonate resin as a constituent component of the resin composition. This is because the melt polymerization method allows easy control of the molecular weight, and thus the melt-polymerized polycarbonate resin has a reduced content of the monofunctional phenol compound as a terminal blocking agent. On the other hand, since it is difficult to control the molecular weight in the interfacial polymerization method, an interfacially polymerized polycarbonate resin usually contains a relatively large amount of the monofunctional phenol compound as a terminal blocking agent. In the resin composition of the present invention, when the interfacially polymerized polycarbonate resin is used instead of the melt-polymerized polycarbonate resin, the content of the monofunctional phenol compound in the resin composition is usually more than 10,000 ppm.

In the resin composition of the present invention, an unnecessary additive should not be used as much as possible, from the viewpoint of further improving the clouding resistance of the molding surface of the mold, and the surface appearance characteristics, mold release characteristics, hydrolysis resistance, vapor deposition suitability and heat-aging suitability of the molded product. Since unnecessary additives become a factor causing gas generation due to decomposition of themselves, the addition thereof should be suppressed as much as possible. However, since the resin composition of the present invention has heat resistance, it is melt-kneaded and/or injection-molded at a high processing temperature of 300° C. or higher to give a resin composition or a molded product. Therefore, it is necessary to suppress the deterioration and decomposition of the resin composition under the condition where the processing is performed at such a high temperature. Furthermore, the deterioration or decomposition of the resin composition also leads to deterioration of hydrolysis resistance. The deterioration or decomposition of the resin composition, and the deterioration of hydrolysis resistance lower mechanical properties, which may be likely to decrease Charpy impact strength and the like of the molded product. Therefore, the resin composition of the present invention needs to contain the phosphite compound (C) and the fatty acid ester (D), from the viewpoint of improving the clouding resistance of the molding surface of the mold, and the surface appearance characteristics, mold release characteristics, hydrolysis resistance, vapor deposition suitability, and heat-aging suitability of the molded product.

[Applications]

A molded product can be produced using the resin composition of the present invention by any molding method such as injection molding method, extrusion molding method, blow molding method, compression molding method, foam molding method, and the like. Since the molded product produced by injection molding method using the resin composition of the present invention has excellent surface appearance characteristics relating to clouding on and around the weld line specific to the injection molding method, it is thus preferable to produce a molded product by the injection molding method.

The resin composition of the present invention is useful for producing a substrate for light reflector. This is because a light reflector obtained by forming a metal layer on a molded product (particularly, a substrate for light reflector) produced using the resin composition of the present invention is excellent in vapor deposition suitability and heat-aging suitability relating to clouding of the surface of the metal layer on and around the weld line.

The substrate for light reflector is a support for supporting the metal layer and constitutes the light reflector by forming the metal layer thereon. The light reflector may be a reflector for any light source, such as a lamp for vehicle mounting, home lighting, and the like. The molded product produced using the resin composition of the present invention is particularly useful as a substrate for light reflector of a lamp for vehicle mounting. This is because, since the resin composition of the present invention is capable of producing a molded product having excellent surface appearance characteristics, vapor deposition suitability, and heat-aging suitability while sufficiently preventing mold stains, and has an excellent balance between heat resistance and fluidity, the substrate for light reflector of lamp for vehicle mounting has a higher required performance of the properties (particularly, heat resistance, surface appearance characteristics, vapor deposition suitability, thermal aging suitability, etc.) than substrates for other applications. The molded product produced using the resin composition of the present invention (particularly, a substrate for light reflector) is excellent in mold release characteristics and hydrolysis resistance, which is one of the reasons why the resin composition of the present invention is particularly useful for producing the substrate for light reflector of lamp for vehicle mounting. Specifically, since the substrate for light reflector of lamp for vehicle mounting is mass-produced, the substrate for light reflector is required to have excellent mold release characteristics. In addition, since the substrate for light reflector of lamp for vehicle mounting is often placed in a relatively high-temperature environment, and further placed in a high-temperature and high-humidity environment when raining, the substrate for light reflector is also required to have excellent hydrolysis resistance. Examples of the light reflector of lamp for vehicle mounting include a lamp reflector and an extension reflector.

In particular, for hydrolysis resistance, the molded product containing the resin composition of the present invention has a logarithmic viscosity retention rate after the high temperature and high humidity environment test of usually 56%, preferably 60% or more, more preferably 64% or more. The high-temperature and high-humidity environment test is a test in which a molded product is held for 75 hours under the conditions of the temperature of 130° C., the relative humidity of 75% RH, and the pressure of 0.2 MPa. The logarithmic viscosity retention rate after the high temperature and high humidity environment test is a ratio to the logarithmic viscosity before the high temperature and high humidity environment test.

The method of forming a metal layer on the substrate for light reflector is not particularly limited, and for example, a metal layer such as aluminum or the like can be formed by means such as vacuum deposition. When a metal layer is formed, a method of forming a metal layer directly on the substrate for light reflector (direct vapor deposition method), a method in which once a primer is applied to the surface of the substrate for light reflector and then a vapor deposition layer is formed thereon, or the like may be arbitrarily selected. Since the molded product obtained using the resin composition of the present invention has improved smoothness and surface appearance, the direct vapor deposition method may be preferably adopted. The vapor deposition layer formed on the molded product obtained using the resin composition of the present invention not only has a high reflection efficiency as a light reflector, but is able to maintain the reflection efficiency for a long period of time without being deformed by heat when a lamp is lit, and in addition, the vapor deposition layer is less likely to fall off from the molded product.

EXAMPLES

Hereinafter, the present invention will be described in more detail with reference to Examples, Comparative Examples and Reference Examples, but the present invention is not limited to the following Examples.

1. Evaluation Methods (1) Total Amount of Monofunctional Phenol Compounds

Pyrolysis/gas chromatography-mass spectrometry (Py/GC-MS) was performed using resin composition pellets in the following equipment and conditions, and the total amount of three types of phenol compounds including phenol, p-tert-butylphenol, and p-cumylphenol was expressed in units of ppm as a value in terms of decane.

(Analysis Conditions)

1-1. Py System: PY2020D made by Frontier Laboratories Ltd.

Under helium gas atmosphere, temperature was increased from a starting temperature of 40° C. at 20° C./min, and held for 5 minutes when reaching 370° C., and the generated gas collected under the above conditions was identified and quantified by the following GC system and MS system.

1-2. GC System: HP-6890 Series Made by Hewlett-Packard Co.

Temperature-rising conditions: Held at 40° C. for 3 minutes, then increased to 150° C. at 10° C./min, increased from 150° C. to 320° C. at 20/min, and held at 320° C. for 3 minutes.

Column: UltraALLOY-5 (30 m×0.25 mm×0.25 μm)

Split: 50:1

1-3. MS System: HP-5973 Series made by Hewlett-Packard Co.

Mass range: Scan measurement (mass range: 29.0 to 550.0)

Transfer line: 320° C.

(2) Logarithmic Viscosity

Using 1,1,2,2-tetrachloroethane as a solvent, a logarithmic viscosity was measured at the temperature of 25° C. and was expressed in units of dL/g.

(3) Fluidity

Resin composition pellets were dried by hot air at 120° C. for 12 hours or more, and a test piece was then molded using an injection molding machine (EC100N type made by Toshiba Machine Co., Ltd.) at resin temperature of 320° C. or 350° C., mold temperature of 100° C., and injection pressure of 150 MPa for injection time of 4 seconds, at set injection speed of 150 mm/second. Then, a flow length of the test piece was measured. The number of test pieces was 5, and the average value of 5 test pieces was taken as the flow length under each evaluation condition.

As the mold, a bar flow test mold having thickness of 2 mm and width of 20 mm was used. Under the same resin temperature conditions, it was found that the longer the flow length, the better the fluidity. When the flow lengths measured under the same conditions were compared, a difference of 5 mm or more, if exists, was determined as a significant difference.

The flow length at the resin temperature of 350° C. was evaluated as follows.

⊚: 420 mm or more (best);
◯: 390 mm or more and less than 420 mm (good);
Δ: 290 mm or more and less than 390 mm (no problem in practical use); and
x: Less than 290 mm (problem in practical use).

(4) Vicat Softening Point (Heat Resistance)

In accordance with the B50 method of JIS K 7206, a Vicat softening point was measured. The Vicat softening point was measured with an HDT tester (heat distortion tester) (made by Toyo Seiki Seisaku-sho, Ltd.). As a test piece, a molded product having thickness of 4 mm was used for measurement.

The Vicat softening point was evaluated as follows.
⊚⊚: 170° C. or higher (excellent: extra quality);
⊚: 160° C. or higher and lower than 170° C. (best);
◯: 150° C. or higher and lower than 160° C. (good);
Δ: 140° C. or higher and lower than 150° C. (no problem in practical use); and
x: Lower than 140° C. (problem in practical use).

(5) Clouding resistance of Molding Surface of Mold

Resin composition pellets were dried by hot air at 120° C. for 8 hours or more, and a test piece mold was then attached to an injection molding machine (EC100N type made by Toshiba Machine Co., Ltd.). While the resin temperature was set to an optimum temperature (see Tables) for each resin composition, the mold temperature was set to 90° C., and injection molding was performed to give a molded product (70 mm×40 mm). The molded product was the one whose thickness was changed in three steps of 1 mm, 2 mm and 3 mm. In addition, the molding surface of the mold was mirror-finished with #8000, the injection molding was continuously performed for 50 shots in a short shot state in which the molten resin composition did not completely fill the mold, and the surface of the mold (molding surfaces of the movable mold and the fixed mold) in the vicinity of the leading end of the resin flow was visually checked to see if clouding occurred. The evaluation was performed in 5 grades (light 1<<3<<5 dark) according to the degree of clouding. The smaller the evaluation value of the degree of clouding was, the less the clouding was, which was found to be good.

⊙: Evaluation value=1 (best);
◯: Evaluation value=2 (good);
Δ: Evaluation value=3 (no problem in practical use);
x: Evaluation value=4 (problem in practical use); and
xx: Evaluation value=5 (problem in practical use).

(6) Surface Appearance Characteristics of Molded product

Resin composition pellets were dried by hot air at 120° C. for 8 hours or more, and a test piece mold was then attached to an injection molding machine (EC100N type made by Toshiba Machine Co., Ltd.). While the resin temperature was set to an optimum temperature (see Tables) for each resin composition, the mold temperature was set to 90° C., and injection molding was performed to give a molded product (70 mm×40 mm, thickness: 2 mmt). The molding surface of the mold was mirror-finished with #8000. The mold had two gates, a first gate at the center in the direction of a short side and a second gate at the end of a long side near the other short side facing the short side having the first gate, and the molten resin flowed into the cavity simultaneously from the two gates. The molten resin thus flowed into the cavity merged at the center of the cavity and was cooled to form a weld at the merging portion. The appearance of the surface of the molded product in the weld portion was evaluated according to the following criteria.

⊙: No clouding on and around the weld line (best);
◯: Clouding partially occurred in only one place on and/or around the weld line (good);
Δ: Clouding partially occurred in two or more places on and/or around the weld line, but it was within a practically acceptable range; and
x: A band-shaped clouding occurred on the weld line and/or along its periphery, which was a problem in practical use.

(7) Mold Release Characteristics (6) A molded product (70×40 mm, thickness: 2 mmt) was obtained using the mold used in (6) Surface Appearance Characteristics of Molded product. The procedure was performed under the same conditions as in (6) except that the flow path was changed so that the molten resin flowed into the mold only from the first gate. The mold release characteristics of the molded product were determined according to the following criteria. A mold with ⊙ has good mold release characteristics, and a mold with x has poor mold release characteristics.

⊙: When the obtained molded product was released from the mold, no chattering noise generated and the molded product was able to be taken out without resistance. Therefore, no mark of the ejector pin remained on the molded product.

x: When the obtained molded product was released from the mold, chattering noise was generated and a mark of the ejector pin remained on the molded product.

The "chattering noise" is a sound generated at the time of mold release and is caused by bad mold release.

(8) Hydrolysis Resistance

Resin composition pellets were dried by hot air at 120° C. for 8 hours or more, and a test piece mold was then attached to an injection molding machine (EC100N type made by Toshiba Machine Co., Ltd.). While the resin temperature was set to an optimum temperature (see Tables) for each resin composition, the mold temperature was set to 90° C., and injection molding was performed to give a molded product (70 mm×10 mm, thickness: 4 mmt). The logarithmic viscosity of the obtained molded product was measured according to the conditions in (2) Logarithmic viscosity.

On the other hand, the obtained test piece was put into a pressure cooker (Model PC-242HSR2 made by Hirayama Manufacturing Corporation), and treated for 75 hours under the conditions of a temperature of 130° C., a relative humidity of 75% RH, and a pressure of 0.2 MPa. The logarithmic viscosity of the molded product was measured in the same manner as above, and a logarithmic viscosity retention rate of the logarithmic viscosity after the treatment to the one before the treatment was calculated by the following formula.

When the logarithmic viscosity retention rate of the molded product was 56% or more, the hydrolysis resistance was determined as "no problem in practical use".

Logarithmic viscosity retention rate of molded product (%)=(logarithmic viscosity of molded product after treatment/logarithmic viscosity of molded product before treatment)×100

⊙: Retention rate of 64% or more (best);
◯: Retention rate of 60% or more and less than 64% (good);
Δ: Retention rate of 56% or more and less than 60% (no problem in practical use); and x: Retention rate of less than 56% (problem in practical use).

(9) Vapor Deposition Suitability of Molded Product

Aluminum was vapor-deposited on the mirror surface side of the molded product obtained in (6) using a bell-jar type vacuum vapor deposition apparatus (made by ULVAC, Inc.) without undercoating. The thickness of the vapor deposition layer was about 0.1 μm. The initial appearance of the molded product having the aluminum vapor deposition layer formed on the surface was visually evaluated according to the following criteria.

⊙: Entire surface of the vapor deposition layer was mirror surface, there was no clouding, and the appearance of the molded product was best;

○: Clouding partially occurred in only one place on the surface of the vapor deposition layer on and around the weld line, but the appearance of the molded product was good;

Δ: Clouding partially occurred in two or more places on the surface of the vapor deposition layer on and around the weld line, but there was no problem in practical use; and x: Clouding entirely occurred on the surface of the vapor deposition layer on and around the weld line, and the appearance of the molded product was poor (problem in practical use).

(10) Heat-Aging Suitability of Molded Product (Evaluation According to Actual Use)

Each of the molded products having the vapor deposition layer obtained in (7) was subjected to a heat-aging test for 24 hours under the conditions of temperature of 135° C. in a high temperature furnace. The heat-aging test is a treatment in which the molded product is allowed to stand at a predetermined temperature for a predetermined time. With respect to the molded product after the heat-aging test, (i) glossiness of the surface of the vapor deposition layer and (ii) adhesive properties of the vapor deposition layer were evaluated.

(i) Glossiness of Surface of Vapor Deposition Layer

In accordance with JIS Z8741, using a gloss meter (VG-2000 type made by Nippon Denshoku Industries Co., Ltd.), surface glossiness at incident angle of 20° on the surface of the vapor deposition layer of each molded product was measured and evaluated in 4 grades according to the following criteria. In (9), when clouding occurred on the surface of the vapor deposition layer, glossiness was measured particularly in the vicinity of the clouding. The measurement was performed at N=5, and the average value of the measurement results was determined as the glossiness in the molded product.

⊙: Glossiness of 1500 or more (best);

○: Glossiness of 1000 or more and less than 1500 (good);

Δ: Glossiness of 750 or more and less than 1000 (no problem in practical use); and x: Glossiness of less than 750 (problem in practical use).

(ii) Adhesive Properties of Vapor Deposition Layer

In accordance with the X-cut tape method specified in JIS K5400, a cross-cut (X-cut) was made on the vapor deposition layer of each molded product with a cutter knife, a cellophane tape was attached thereto and then peeled off. The measurement was performed according to the following criteria. The measurement was performed at N=5, and an average value of the measurement results was evaluated as adhesive properties of the vapor deposition layer in the molded product.

⊙: No peeling of the vapor deposition layer (best);

○: Slight peeling in the X cut portion (good);

Δ: Peeling within 3.0 mm in either direction from the intersection of the X-cut portion (no problem in practical use); and x: Significant peeling from the X-cut portion (problem in practical use).

(11) Overall Evaluation

Overall evaluation was made based on the evaluation results of the fluidity, the heat resistance, the clouding resistance of the molding surface of the mold, the surface appearance characteristics of the molded product, the vapor deposition suitability, and the heat-aging suitability.

⊙⊙: Of all the evaluation results, the lowest evaluation result was ⊙ and the heat resistance was ⊙⊙.

⊙: All the evaluation results were ⊙.

○: The lowest evaluation result of all the evaluation results was ○.

Δ: The lowest evaluation result of all the evaluation results was Δ.

x: The lowest evaluation result of all the evaluation results was x or xx.

2. Raw Materials (1) Polyarylate: U-powder L type (made by Unitika Ltd.) (logarithmic viscosity: 0.54)

(2) Polycarbonates

Polycarbonate b1: Melt-polymerized polycarbonate: Diphenyl carbonate and polycarbonate polymerized from bisphenol A WONDERLITE PC-175 (made by Chimei Corporation) (logarithmic viscosity: 0.39)

Polycarbonate b2: Interfacially polymerized polycarbonate: Polycarbonate polymerized from phosgene and bisphenol A SD POLYCA 200-80 (made by Sumika Polycarbonate Ltd.) (logarithmic viscosity: 0.39)

(3) Phosphite Compounds

Phosphite compound c1: Bis(2,6-di-tert-butyl-4-methylphenyl)pentaerythritol diphosphite (ADK STAB PEP-36 made by ADEKA Corporation), melting point: 237° C.

Phosphite compound c2: Bis(2,4-di-tert-butylphenyl)pentaerythritol diphosphite (ADK STAB PEP-24G made by ADEKA Corporation), melting point: 165° C.

Phosphite compound c3: Tris(2,4-di-tert-butylphenyl) phosphite (ADK STAB 2112 made by ADEKA Corporation), melting point: 185° C.

Phosphite compound c4: Distearyl pentaerythritol diphosphite (ADK STAB PEP-8 made by ADEKA Corporation)

Non-phosphite compound c5 (phosphonite compound): Tetrakis(2,4-di-t-butylphenyl)[1,1-biphenyl]-4,4'-diyl-bisphosphonite (Irgafos P-EPQ made by BASF)

(4) Compound Other Than Phosphite

Hindered phenolic compound: Irganox 1010 (pentaerythrityl-tetrakis[3-(3,5-di-t-butyl-4-hydroxyphenyl)propionate], (Irganox 1010 made by BASF)

(5) Fatty Acid Esters

Fatty acid ester d1: Dipentaerythritol fatty acid ester: Dipentaerythritol hexastearate (VPG-2571 made by Emery Oleochemicals, terminal hydroxyl group: 0 to 10.0 mgKOH)

Fatty acid ester d2: Pentaerythritol fatty acid ester: Pentaerythritol tetrastearate (VPG-861 made by Emery Oleochemicals, terminal hydroxyl group: 20 to 37 mgKOH)

Non-fatty acid ester d3: Compound other than fatty acid esters: Paraffin wax (Luvax 1266 made by Nippon Seiro Co., Ltd.)

(6) Colorant

Carbon black (UP-D 701; made by Dainichiseika Color & Chemicals Mfg. Co., Ltd.)

Examples 1 to 15, Comparative Examples 1 to 13, and Reference Examples 1 to 2

Predetermined polyarylate and polycarbonate were dried at 120° C. for 8 hours or more using a hot air circulation dryer, and then uniformly kneaded with the phosphite compound (or non-phosphite compound) and the fatty acid ester (or the non-fatty acid ester) at the blending ratios shown in Tables 1 to 3. Specifically, with respect to 100 parts by mass of the total amount of polyarylate and polycarbonate, a predetermined amount of the phosphite compound (or non-phosphite compound) and a predetermined amount of the fatty acid ester (or non-fatty acid ester), and 0.05 parts by mass of a colorant were fed to the main feeding opening of a same-direction twin-screw extruder (TEM-37BS made by Toshiba Machine Co., Ltd.) using a continuous weight or volumetric or counting feeder made by Kubota Corporation. Then, melt kneading was performed at a predetermined resin temperature and a discharge rate of 10 kg/hour, the resin composition drawn in a strand form from a nozzle was cooled and solidified by passing through a water bath, and after cutting with a pelletizer, the cut pieces of the resin composition were dried by hot air at 120° C. for 8 hours to give resin composition pellets. The predetermined resin temperature is the molding temperature shown in Tables 1 to 3. Further, the obtained resin composition pellets were injection-molded according to the method described in the above evaluation method to give a molded product.

Various evaluations were performed using the obtained resin composition pellets or the molded products. The results are shown in Tables 1 to 3.

In Reference Examples 1 and 2, the polycarbonate resin alone was subjected to the above-mentioned evaluations (fluidity, hydrolysis resistance, and heat-aging suitability were not evaluated).

TABLE 1

| Resin composition | | Examples | | | | | | | | |
|---|---|---|---|---|---|---|---|---|---|---|
| | | 1 | 2 | 3 | 4 | 5 | 6 | 7 | 8 | 9 |
| Polyarylate | (Part by mass) | 5 | 20 | 40 | 50 | 60 | 70 | 80 | 95 | 40 |
| Polycarbonate b1 | | 95 | 80 | 60 | 50 | 40 | 30 | 20 | 5 | 60 |
| Phosphite compound c1 PEP36 | | 0.05 | 0.05 | 0.05 | 0.05 | 0.05 | 0.05 | 0.05 | 0.05 | 0 |
| Phosphite compound c2 PEP24G | | 0 | 0 | 0 | 0 | 0 | 0 | 0 | 0 | 0 |
| Phosphite compound c3 2112 | | 0 | 0 | 0 | 0 | 0 | 0 | 0 | 0 | 0.05 |
| Phosphite compound c4 PEP8 | | 0 | 0 | 0 | 0 | 0 | 0 | 0 | 0 | 0 |
| Fatty acid ester d1 2571 | | 0.2 | 0.2 | 0.2 | 0.2 | 0.2 | 0.2 | 0.2 | 0.2 | 0.2 |
| Content of monofunctional phenol compound (ppm) | | 1000 | 1200 | 2000 | 3000 | 4000 | 6000 | 7500 | 8000 | 2000 |
| Logarithmic viscosity (dL/g) | | 0.39 | 0.42 | 0.45 | 0.46 | 0.48 | 0.49 | 0.50 | 0.53 | 0.45 |
| Fluidity (mm) | Bar flow 320° C. | 499 | 450 | 390 | 363 | 330 | 308 | 270 | 205 | 390 |
| | Bar flow 350° C. | 602⊙ | 570⊙ | 528⊙ | 497⊙ | 468⊙ | 420⊙ | 380Δ | 298Δ | 528⊙ |
| Vicat softening temperature B50 (° C.) | | 140Δ | 144Δ | 153◯ | 160⊙ | 166⊙ | 178⊙⊙ | 183⊙⊙ | 190⊙⊙ | 153◯ |
| Clouding resistance of molding surface of mold | | 1⊙ | 1⊙ | 1⊙ | 1⊙ | 1⊙ | 1⊙ | 2◯ | 2◯ | 2◯ |
| Surface appearance of molded product | | ⊙ | ⊙ | ⊙ | ⊙ | ⊙ | ⊙ | ◯ | ◯ | ◯ |
| Mold release characteristic of molded product | | ⊙ | ⊙ | ⊙ | ⊙ | ⊙ | ⊙ | ⊙ | ⊙ | ⊙ |
| Hydrolysis resistance (logarithmic viscosity of molded product) PCT 130° C. 75% RH 75 h | Logarithmic viscosity before treatment | 0.38 | 0.41 | 0.44 | 0.44 | 0.46 | 0.47 | 0.48 | 0.51 | 0.44 |
| | Logarithmic viscosity after treatment | 0.27 | 0.28 | 0.30 | 0.30 | 0.31 | 0.30 | 0.30 | 0.31 | 0.37 |
| | Retention rate (%) | 71⊙ | 68⊙ | 68⊙ | 68⊙ | 67⊙ | 64⊙ | 63◯ | 61◯ | 84⊙ |
| Vapor deposition suitability of molded product | | ⊙ | ⊙ | ⊙ | ⊙ | ⊙ | ⊙ | ◯ | ◯ | ⊙ |
| Heat-aging suitability of molded product | Glossiness | ⊙ | ⊙ | ⊙ | ⊙ | ⊙ | ⊙ | ◯ | ◯ | ⊙ |
| | Adhesive properties | ⊙ | ⊙ | ⊙ | ⊙ | ⊙ | ⊙ | ◯ | ◯ | ⊙ |
| Molding temperature during molding (° C.) | | 320 | 330 | 340 | 340 | 350 | 360 | 360 | 370 | 340 |
| Overall evaluation | | Δ | Δ | ◯ | ◯ | ⊙ | ⊙⊙ | Δ | Δ | ◯ |

| Resin composition | | Examples | | | | | | |
|---|---|---|---|---|---|---|---|---|
| | | 10 | 11 | 12 | 13 | 14 | 15 | 16 |
| Polyarylate | (Part by mass) | 70 | 80 | 70 | 70 | 70 | 70 | 70 |
| Polycarbonate b1 | | 30 | 20 | 30 | 30 | 30 | 30 | 30 |
| Phosphite compound c1 PEP36 | | 0 | 0 | 0 | 0.02 | 0.1 | 0.05 | 0 |
| Phosphite compound c2 PEP24G | | 0 | 0 | 0 | 0 | 0 | 0 | 0.05 |
| Phosphite compound c3 2112 | | 0.05 | 0.05 | 0 | 0 | 0 | 0 | 0 |
| Phosphite compound c4 PEP8 | | 0 | 0 | 0.05 | 0 | 0 | 0 | 0 |
| Fatty acid ester d1 2571 | | 0.2 | 0.2 | 0.2 | 0.2 | 0.2 | 0.02 | 0.2 |
| Content of monofunctional phenol compound (ppm) | | 6000 | 7500 | 6000 | 6000 | 6000 | 6000 | 6000 |
| Logarithmic viscosity (dL/g) | | 0.49 | 0.50 | 0.49 | 0.49 | 0.49 | 0.49 | 0.49 |
| Fluidity (mm) | Bar flow 320° C. | 308 | 270 | 308 | 308 | 308 | 308 | 308 |
| | Bar flow 350° C. | 420⊙ | 380Δ | 420⊙ | 420⊙ | 420⊙ | 420⊙ | 420⊙ |
| Vicat softening temperature B50 (° C.) | | 178⊙⊙ | 183⊙⊙ | 178⊙⊙ | 178⊙⊙ | 178⊙⊙ | 178⊙⊙ | 178⊙⊙ |
| Clouding resistance of molding surface of mold | | 2◯ | 2◯ | 3Δ | 1⊙ | 1⊙ | 1⊙ | 2◯ |
| Surface appearance of molded product | | ◯ | ◯ | Δ | ⊙ | ⊙ | ⊙ | ⊙ |
| Mold release characteristic of molded product | | ⊙ | ⊙ | ⊙ | ⊙ | ⊙ | ⊙ | ⊙ |
| Hydrolysis resistance (logarithmic viscosity of molded product) | Logarithmic viscosity before treatment | 0.47 | 0.48 | 0.47 | 0.47 | 0.47 | 0.47 | 0.47 |

TABLE 1-continued

| | | | | | | | | |
|---|---|---|---|---|---|---|---|---|
| PCT 130° C. 75% RH 75 h | Logarithmic viscosity after treatment | 0.38 | 0.40 | 0.27 | 0.33 | 0.28 | 0.30 | 0.31 |
| | Retention rate (%) | 81⊙ | 83⊙ | 57△ | 68⊙ | 60○ | 64⊙ | 66⊙ |
| Vapor deposition suitability of molded product | | ⊙ | ○ | ○ | ⊙ | ⊙ | ⊙ | ⊙ |
| Heat-aging suitability of molded product | Glossiness | ⊙ | ○ | ○ | ⊙ | ⊙ | ⊙ | ⊙ |
| | Adhesive properties | ⊙ | ○ | ○ | ⊙ | ⊙ | ⊙ | ⊙ |
| Molding temperature during molding (° C.) | | 360 | 360 | 360 | 360 | 360 | 360 | 360 |
| Overall evaluation | | ○ | △ | △ | ⊙⊙ | ○ | ⊙⊙ | ○ |

"—" Not measured

TABLE 2

| Resin composition | | Comparative examples | | | | | | | |
|---|---|---|---|---|---|---|---|---|---|
| | | 1 | 2 | 3 | 4 | 5 | 6 | 7 | 8 |
| Polyarylate | (Part by mass) | 20 | 40 | 50 | 70 | 80 | 70 | 70 | 70 |
| Polycarbonate b1 | | 0 | 0 | 0 | 0 | 0 | 30 | 30 | 30 |
| Polycarbonate b2 | | 80 | 60 | 50 | 30 | 20 | 0 | 0 | 0 |
| Phosphite compound c1 PEP36 | | 0.05 | 0.05 | 0.05 | 0.05 | 0.05 | 0 | 0 | 0 |
| Phosphite compound c4 PEP8 | | 0 | 0 | 0 | 0 | 0 | 0 | 0.05 | 0 |
| Non-phosphite compound c5 | | 0 | 0 | 0 | 0 | 0 | 0 | 0 | 0 |
| Fatty acid ester d1 2571 | | 0.2 | 0.2 | 0.2 | 0.2 | 0.2 | 0 | 0 | 0 |
| Fatty acid ester d2 861 | | 0 | 0 | 0 | 0 | 0 | 0 | 0 | 0.2 |
| Non-fatty acid ester d3 | | 0 | 0 | 0 | 0 | 0 | 0 | 0 | 0 |
| Content of monofunctional phenol compound (ppm) | | 13000 | 13000 | 13000 | 12000 | 12000 | 6000 | 6000 | 6000 |
| Logarithmic viscosity (dL/g) | | 0.42 | 0.45 | 0.46 | 0.49 | 0.50 | 0.49 | 0.49 | 0.49 |
| Fluidity (mm) | Bar flow 320° C. | 445 | 385 | 357 | 303 | 303 | 308 | 308 | 308 |
| | Bar flow 350° C. | 560⊙ | 520⊙ | 490⊙ | 413○ | 413○ | 420⊙ | 420⊙ | 420⊙ |
| Vicat softening temperature B50 (° C.) | | 141△ | 153○ | 160⊙ | 178⊙⊙ | 182⊙⊙ | 178⊙⊙ | 178⊙⊙ | 178⊙⊙ |
| Clouding resistance of molding surface of mold | | 3△ | 4X | 5XX | 5XX | 5XX | 3△ | 3△ | 3△ |
| Surface appearance of molded product | | △ | X | X | X | X | X | △ | X |
| Mold release characteristics of molded product | | X | X | X | X | X | X | X | X |
| Hydrolysis resistance (logarithmic viscosity of molded product) | Logarithmic viscosity before treatment | 0.41 | 0.44 | 0.44 | 0.47 | 0.48 | 0.48 | 0.47 | 0.47 |
| PCT 130° C. 75% RH 75 h | Logarithmic viscosity after treatment | 0.28 | 0.30 | 0.30 | 0.30 | 0.30 | 0.42 | 0.26 | 0.28 |
| | Retention rate (%) | 68⊙ | 68⊙ | 68⊙ | 64⊙ | 63○ | 88⊙ | 55X | 60○ |
| Vapor deposition suitability of molded product | | X | X | X | X | X | X | △ | X |
| Heat-aging suitability of molded product | Glossiness | △ | X | X | X | X | X | △ | △ |
| | Adhesive properties | X | X | X | △ | △ | X | X | X |
| Molding temperature during molding (° C.) | | 330 | 340 | 340 | 360 | 360 | 360 | 360 | 360 |
| Overall evaluation | | X | X | X | X | X | X | X | X |

| Resin composition | | Comparative examples | | | Reference examples | |
|---|---|---|---|---|---|---|
| | | 9 | 10 | 11 | 1 | 2 |
| Polyarylate | (Part by mass) | 70 | 70 | 70 | 0 | 0 |
| Polycarbonate b1 | | 30 | 30 | 30 | 100 | 0 |
| Polycarbonate b2 | | 0 | 0 | 0 | 0 | 100 |
| Phosphite compound c1 PEP36 | | 0 | 0.05 | 0.05 | 0.05 | 0.05 |
| Phosphite compound c4 PEP8 | | 0 | 0 | 0 | 0 | 0 |
| Non-phosphite compound c5 | | 0.05 | 0 | 0 | 0 | 0 |
| Fatty acid ester d1 2571 | | 0 | 0 | 0 | 0.2 | 0.2 |
| Fatty acid ester d2 861 | | 0.2 | 0.2 | 0 | 0 | 0 |
| Non-fatty acid ester d3 | | 0 | 0 | 0.2 | 0 | 0 |
| Content of monofunctional phenol compound (ppm) | | 6000 | 6000 | 6000 | 1000 | 10000 |
| Logarithmic viscosity (dL/g) | | 0.49 | 0.49 | 0.49 | 0.39 | 0.39 |
| Fluidity (mm) | Bar flow 320° C. | 308 | 308 | 308 | — | — |
| | Bar flow 350° C. | 420⊙ | 420⊙ | 420⊙ | — | — |
| Vicat softening temperature B50 (° C.) | | 178⊙⊙ | 178⊙⊙ | 178⊙⊙ | 137X | 136X |
| Clouding resistance of molding surface of mold | | 3△ | 2○ | 3△ | 1⊙ | 1⊙ |
| Surface appearance of molded product | | △ | △ | △ | ⊙ | ⊙ |
| Mold release characteristics of molded product | | X | X | X | ⊙ | ⊙ |
| Hydrolysis resistance (logarithmic viscosity of molded product) | Logarithmic viscosity before treatment | 0.47 | 0.47 | 0.47 | — | — |

TABLE 2-continued

| | | | | | | |
|---|---|---|---|---|---|---|
| PCT 130° C. 75% RH 75 h | Logarithmic viscosity after treatment | 0.26 | 0.29 | 0.30 | — | — |
| | Retention rate (%) | 55X | 62○ | 64⊙ | — | — |
| Vapor deposition suitability of molded product | | Δ | Δ | Δ | ⊙ | ⊙ |
| Heat-aging suitability of molded product | Glossiness | Δ | Δ | Δ | — | — |
| | Adhesive properties | X | X | X | — | — |
| Molding temperature during molding (° C.) | | 360 | 360 | 360 | 300 | 300 |
| Overall evaluation | | X | X | X | X | X |

"—" Not measured.

TABLE 3

| | | Comparative examples | |
|---|---|---|---|
| Resin composition | | 12 | 13 |
| Polyarylate (Part by mass) | | 70 | 70 |
| Polycarbonate b1 | | 30 | 30 |
| Polycarbonate b2 | | 0 | 0 |
| Phosphite compound c1 PEP36 | | 0.05 | 0 |
| Phosphite compound c4 PEP8 | | 0 | 0 |
| Non-phosphite compound c5 | | 0 | 0 |
| Fatty acid ester d1 2571 | | 0 | 0.2 |
| Fatty acid ester d2 861 | | 0 | 0 |
| Non-fatty acid ester d3 | | 0 | 0 |
| Content of monofunctional phenol compound (ppm) | | 6000 | 6000 |
| Logarithmic viscosity (dL/g) | | 0.49 | 0.49 |
| Fluidity (mm) | Bar flow 320° C. | 308 | 308 |
| | Bar flow 350° C. | 420⊙ | 420⊙ |
| Vicat softening temperature B50 (° C.) | | 178⊙○ | 178⊙○ |
| Clouding resistance of molding surface of mold | | 3Δ | 3Δ |
| Surface appearance of molded product | | ⊙ | X |
| Mold release characteristics of molded product | | X | X |
| Hydrolysis resistance (logarithmic viscosity of molded product) PCT 130° C. 75% RH 75 h | Logarithmic viscosity before treatment | 0.47 | 0.47 |
| | Logarithmic viscosity after treatment | 0.26 | 0.26 |
| | Retention rate (%) | 55X | 55X |
| Vapor deposition suitability of molded product | | ⊙ | X |
| Heat-aging suitability of molded product | Glossiness | ⊙ | X |
| | Adhesive properties | ⊙ | X |
| Molding temperature during molding (° C.) | | 360 | 360 |
| Overall evaluation | | X | X |

"—" Not measured.

In Examples 1 to 16, the resin compositions had an excellent balance between heat resistance (Vicat softening point) and fluidity (bar flow length), and were sufficiently excellent in clouding resistance of the molding surface of the mold. In addition, the molded product was sufficiently excellent in surface appearance characteristics, mold release characteristics, and hydrolysis resistance. Furthermore, the molded product was sufficiently excellent in vapor deposition suitability and heat-aging suitability of the vapor deposition layer.

In Comparative Examples 1 to 5, since the specified polycarbonate resin was not used, the clouding resistance of the molding surface of the mold was inferior, and a band-shaped clouding occurred along the weld line of the molded product. In addition, the molded product was poor in mold release characteristics. Furthermore, the molded product was also poor in vapor deposition suitability and heat-aging suitability.

In Comparative Example 6, since the specified phosphite compound and fatty acid ester were not contained, the surface appearance characteristics, mold release characteristics, vapor deposition suitability and heat-aging suitability of the molded product were poor.

In Comparative Example 7, since the specified fatty acid ester was not contained, the mold release characteristics, hydrolysis resistance and heat-aging suitability of the molded product were poor.

In Comparative Example 8, since the specified phosphite compound and fatty acid ester were not contained, the surface appearance, mold release characteristics, vapor deposition suitability and heat-aging suitability of the molded product were poor.

In Comparative Example 9, since a phosphorus compound which was not the specified phosphite compound was used, and a fatty acid ester which was not specified was used, the mold release characteristics, hydrolysis resistance and heat-aging of the molded product were poor.

In Comparative Examples 10 and 11, since a fatty acid ester other than the dipentaerythritol fatty acid ester was used, the mold release characteristics and heat-aging of the molded product were poor.

In Comparative Examples 12 and 13, since one of the specified phosphite compound and fatty acid ester was not used, the mold release characteristics and hydrolysis resistance of the molded product were poor.

INDUSTRIAL APPLICABILITY

The resin composition of the present invention is useful, for example, for producing a substrate for light reflector by an injection molding method.

The invention claimed is:
1. A resin composition, comprising:
(A) a polyarylate resin;
(B) a melt-polymerized polycarbonate resin;
(C) bis(2,6-di-tert-butyl-4-methylphenyl)pentaerythritol diphosphite; and
(D) a dipentaerythritol fatty acid ester,
a mass ratio (A/B) of the (A) polyarylate resin and the (B) melt-polymerized polycarbonate resin being from 2/98 to 98/2, and
the resin composition having a Vicat softening point of 140° C. or higher.
2. The resin composition of claim 1, wherein a content of the (C) phosphite compound is from 0.01 to 0.5 parts by mass with respect to 100 parts by mass of the total amount of the (A) polyarylate resin and the (B) melt-polymerized polycarbonate resin.
3. The resin composition of claim 1, wherein a content of the (D) dipentaerythritol fatty acid ester is from 0.01 to 1.0 parts by mass with respect to 100 parts by mass of the total amount of the (A) polyarylate resin and the (B) melt-polymerized polycarbonate resin.

4. The resin composition of claim 1, wherein the (D) dipentaerythritol fatty acid ester is one or more compounds selected from the group consisting of dipentaerythritol hexalaurate, dipentaerythritol hexamyristate, dipentaerythritol hexapalmitate, dipentaerythritol hexastearate, dipentaerythritol hexabehenate, dipentaerythritol adipic stearate and dipentaerythritol adipic stearate oligomer.

5. The resin composition of claim 1, where a mixing ratio of the (A) polyarylate resin and the (B) melt-polymerized polycarbonate resin is from 30/70 to 75/25 by mass ratio.

6. The resin composition of claim 5, wherein the mixing ratio of the (A) polyarylate resin and the (B) melt-polymerized polycarbonate resin is from 45/55 to 75/25 by mass ratio, and
a content of the (C) bis(2,6-di-tert-butyl-4-methylphenyl) pentaerythritol diphosphite is from 0.01 to 0.08 parts by mass with respect to 100 parts by mass of the total amount of the (A) polyarylate resin and the (B) melt-polymerized polycarbonate resin.

7. The resin composition of claim 6, wherein the mixing ratio of the (A) polyarylate resin and the (B) melt-polymerized polycarbonate resin is from 65/35 to 75/25 by mass ratio.

8. The resin composition of claim 1, wherein a content of a monofunctional phenol compound in the resin composition is 10,000 ppm or less.

9. The resin composition of claim 1, wherein the (B) melt-polymerized polycarbonate resin has a logarithmic viscosity of 0.30 to 0.60 dL/g.

10. The resin composition of claim 1, wherein the (A) polyarylate resin has a logarithmic viscosity of 0.40 to 0.75 dL/g.

11. The resin composition of claim 1, wherein the resin composition has a logarithmic viscosity of 0.35 to 0.65 dL/g.

12. The resin composition of claim 1, being a resin composition for producing a substrate for light reflector.

13. The resin composition of claim 1, being a resin composition for producing a substrate for light reflector of a lamp for vehicle mounting.

14. The resin composition of claim 1, being a resin composition for use in injection molding.

15. A molded product, comprising the resin composition of claim 1.

16. A substrate for light reflector, using the molded product of claim 15.

17. A lamp for vehicle mounting, using the substrate for light reflector of claim 16.

* * * * *